United States Patent [19]

Fogelberg

[11] 4,089,395
[45] May 16, 1978

[54] DIRECTION-SENSITIVE OVERRUNNING CLUTCH

[75] Inventor: Mark John Fogelberg, Muncie, Ind.

[73] Assignee: Borg-Warner Corporation, Chicago, Ill.

[21] Appl. No.: 734,496

[22] Filed: Oct. 21, 1976

[51] Int. Cl.² ............................................. F16D 41/07
[52] U.S. Cl. .................... 192/41 A; 192/45.1
[58] Field of Search ............................ 192/41 A, 45.1

[56] References Cited

U.S. PATENT DOCUMENTS

| 2,028,876 | 1/1936 | Lotts | 192/48 |
| 2,870,890 | 1/1959 | Cobb | 192/45.1 |
| 3,191,458 | 6/1965 | Adams | 74/650 |
| 3,194,369 | 7/1965 | Witte | 192/41 A X |
| 3,599,767 | 8/1971 | Sederquist | 192/41 A X |

*Primary Examiner*—Edgar W. Geoghegan
*Attorney, Agent, or Firm*—Julian Schachner

[57] ABSTRACT

An overrunning clutch is disclosed wherein drive and driven clutch members are engaged by means of sprags which frictionally engage the clutch members in a locking position but which permit relative rotation of the clutch members in a freewheel position. The sprags are part of a sprag assembly including a pair of spaced cages, one frictionally biased to one clutch member and the other frictionally biased to ground. The sprags are symmetrical and provide for double-acting, direction-sensitive operation.

11 Claims, 4 Drawing Figures

DIRECTION-SENSITIVE OVERRUNNING CLUTCH

BACKGROUND OF THE INVENTION

This invention relates generally to double-acting overrunning clutches. More particularly, it relates to a double-acting overrunning clutch of the sprag type wherein engagement is direction-sensitive in that the clutch may be engaged in either direction of rotation and yet be free to permit relative rotation of the clutch members.

Some conventional sprag type overrunning clutches include spaced clutch race members with sprags interposed therebetween. They include a pair of cages to insure that the sprags move together. The cages are arranged to grip the sprags so as to maintain their position and to provide a biasing force tending to engage the sprags with one of the races. This may create undesirable stresses in the sprag assembly, which could interfere with the speed of its response.

Other conventional sprag type overrunning clutches include sprags which define one engaging surface at each end thereof. The surfaces are generally cylindrical with their centers displaced laterally. This provides for a one-way overrunning operation which is not direction-sensitive.

SUMMARY OF THE INVENTION

This invention is directed in brief to a double-acting overrunning clutch of the sprag type. The clutch includes an input drive member and an output driven member, each defining a clutch race. A sprag assembly is interposed between the races.

The sprag assembly includes a pair of spaced cages, one of which is frictionally biased to the drive member and the other of which is frictionally biased to ground. The cages provide loose support for a plurality of sprags such that they are free to respond quickly to effect fast engagement and disengagement of the clutch.

Each of the sprags defines a cylindrical surface at one end thereof, which surface is frictionally engageable with one of the clutch members. At its other end, each sprag defines a pair of spaced cylindrical surfaces, the centers of which overlap and straddle the center of the opposite end surface. This feature also provides for fast engaging and disengaging action of the clutch. It also makes the clutch direction-sensitive; that is, reversing the rotation of the entire clutch assembly also reverses the relative rotation required to effect locking and freewheeling.

BRIEF DESCRIPTION OF THE DRAWING

The objects and advantages of this invention will become apparent to those skilled in the art upon careful consideration of the specification herein, including the drawing, wherein.

Figure 1:
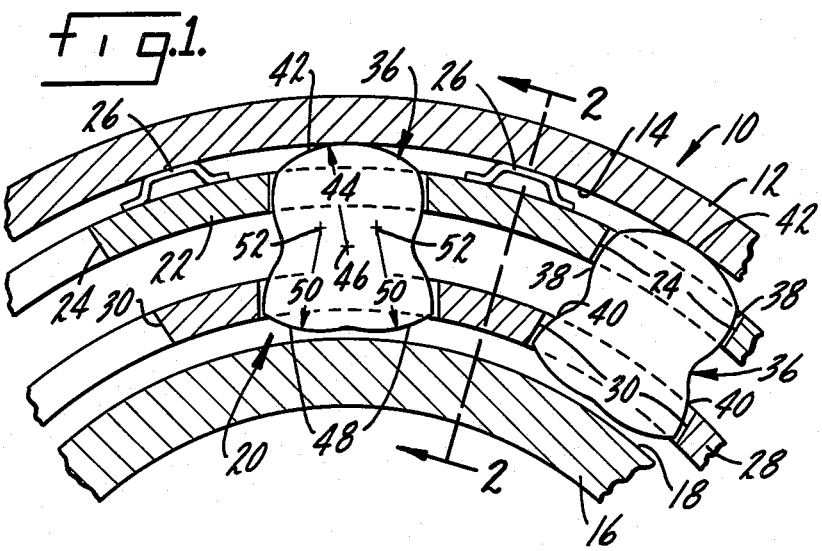
FIG. 1 is a partial sectional view of the clutch showing details of the improved sprag assembly.

While this invention is susceptible of embodiment in many different forms, there is shown in the drawing and will be described herein in detail a preferred embodiment with the understanding that the present disclosure is to be considered as an exemplification of the principles of the invention and is not intended to limit the invention to this embodiment.

DESCRIPTION OF THE PREFERRED EMBODIMENT

Figure 2:
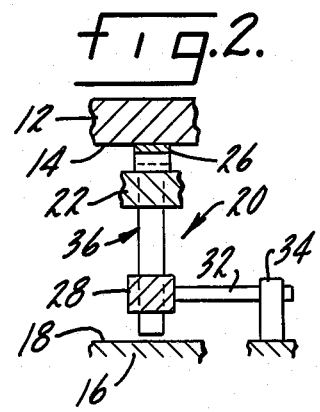
FIG. 2 is a sectional view taken along the line 2—2 of FIG. 1 showing details of the cage biasing mechanism.

Referring now to the drawing in greater detail, there is shown generally in FIGS. 1 and 2 a double-acting overrunning clutch 10. This clutch 10 includes an input or drive member 12 which defines a first clutch race 14. Clutch 10 also includes an output or driven member 16 which defines a second clutch race 18. Members 12 and 16 are mounted in a suitable housing in a conventional manner for rotation about their common axis. Member 12 is adapted to be connected with a source of driving power and member 16 is adapted to be connected with a mechanism to which it is desired that power be directed.

A sprag assembly generally designated as 20 is located between members 12 and 16. Sprag assembly 20 includes a first annular sleeve or cage 22 having a plurality of pairs of spaced interior walls 24, each pair defining an opening therebetween. Cage 22 also is provided with a plurality of pads 26 in frictional contact with race 14 of member 12. Thus, cage 22 is effectively biased to member 12. If desired, pads 26 may be formed from a resilient material or may be otherwise suitably resiliently biased toward frictional contact with race 14.

Sprag assembly 20 also includes a second sleeve or cage 28 having a plurality of pairs of spaced interior walls 30, each pair defining an opening therebetween. One or more arms 32 is carried by cage 28 and extends outwardly therefrom. Each arm 32 supports a shoe 34 in frictional contact with the clutch housing. Thus, cage 28 is effectively biased to ground. If desired, suitable resilient means may be provided for urging shoe 34 into frictional contact with the clutch housing.

Sprag assembly 20 also includes a plurality of coupling members or sprags 36. Each sprag 36 has a pair of side walls defining first portions 38 and second portions 40. Each sprag 36 is supported by cages 22 and 28 with portions 38 and 40 oriented in the openings between walls 24 and 30 of cages 22 and 28, respectively. The relationship is such that the sprags are retained in the openings, but are not gripped tightly by the cages. This allows freedom of movement for the sprags.

Each sprag 36 defines a curved surface 42 at one end thereof. Surface 42 has a radius 44 and a center of curvature 46. Sprag 36 also defines a pair of curved surfaces 48 at the other end thereof. Surfaces 48 preferably are symmetrical and have radii 50 and centers of curvature 52. The total length of radius 44 and one of radii 50 is greater than the radial distance between races 14 and 18. In addition, centers of curvature 52 straddle radius 44 and preferably are oriented symmetrically relative thereto and to center of curvature 46.

Figure 3:
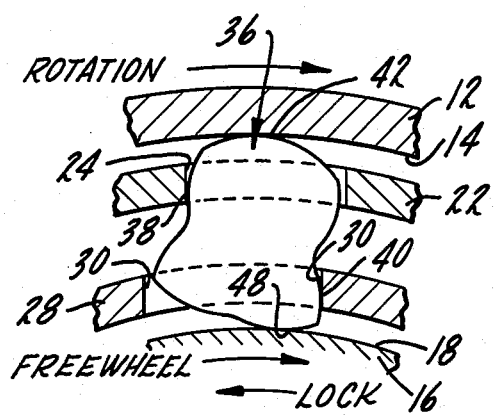
FIG. 3 is a partial sectional view, similar to FIG. 1, showing details of the improved sprag assembly with the clutch rotating in one direction.

In operation, assume that clutch 10 is rotating in the clockwise direction shown in FIG. 3. Cage 22 is frictionally biased to race 14 and thus tends to follow member 12. Cage 28 is frictionally biased to ground. As a result, cage 28 tends to lage behind cage 22 upon rotation of clutch 10. Sprags 36 are pivoted in the clockwise direction. Due to the fact that the length of radius 44 and one of radii 50 is greater than the radial distance between races 14 and 18, surfaces 42 and one of surfaces 48 wedgingly engage races 14 and 18, respectively. Member 16 is carried in the clockwise direction. In this engaged or locked position, torque is transmitted from input member 12 through sprags 36 to output member 16. It should be noted that member 16 is free to overrun member 12 in the clockwise direction, thereby establishing a freewheel condition.

Figure 4:
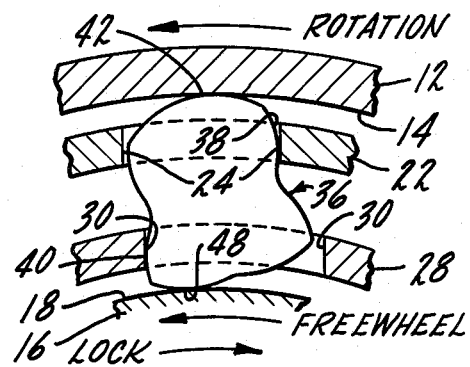
FIG. 4 is a partial sectional view, similar to FIG. 1, showing details of the improved sprag assembly with the clutch rotating in the opposite direction.

Assume now that clutch 10 is rotating in the counterclockwise direction shown in FIG. 4. Cage 22 tends to follow member 12 due to its frictional bias to race 14. Cage 28 tends to lag cage 22 as a result of its frictional bias to ground. Sprags 36 are pivoted in the counterclockwise direction. With the length of radius 44 and the outer of radii 50 being greater than the radial distance between races 14 and 18, surfaces 42 and the other of surfaces 48 wedge between races 14 and 18.

Torque is transmitted from member 12 through sprags 36 to member 16, which is carried in the counterclockwise direction. Again, it should be noted that member 16 is free to overrun member 12, but this time in the counterclockwise direction.

The provision of two curved surfaces 48 at one end of sprag 36 results in the quicker response during the engaging and disengaging functions of clutch 10 than might otherwise be obtained with the use of a single surface. Their symmetry, coupled with the arrangement whereby cage 22 is biased to member 12 and cage 28 is biased to ground, results in a direction-sensitive operation wherein relative rotation between member 12 and 16 in one direction is required to establish a freewheeling condition when clutch 10 rotates in one direction. Upon reversal of rotation of clutch 10, a reversal of the direction of relative rotation between members 12 and 16 is required in order for the clutch to freewheel.

The loose engagement of sprags 36 by cages 22 and 28 allows for uninhibited movement of sprags 36 during the engaging and disengaging functions, so as to insure free and quick response thereof. Cages 22 and 28 orient sprags 36 between members 12 and 16, but do not provide any biasing forces which might tend to bind sprags 36. Further, the provision of pads 26 for biasing cage 22 to race 14 minimizes any adverse effects of centrifugal force which might be apparent if the bias were directed through sprags 36. As a result, operation of clutch 10 is smoother at varying speeds of rotation than might otherwise be expected.

Another advantage of the invention disclosed herein is that the position of sprags 36 may be reversed without adversely affecting operation of clutch 10; that is, surface 42 may be oriented adjacent the inner race and surfaces 48 adjacent the outer race. Operation of clutch 10 would be essentially similar to that described herein above.

Other arrangements, modifications and applications of the invention will be apparent to those skilled in the art and are deemed to be within the scope of the invention, which is limited only by the claims herein.

I claim:

1. A clutch comprising first and second clutch members rotatable about a common axis, and a sprag assembly interposed between said members, said sprag assembly including first and second cages, first means frictionally biasing said first cage to said first member, second means frictionally biasing said second cage to ground, and a plurality of sprags freely supported by said cages between said members, said sprags being pivotable to a first position in wedging engagement with said members and to a second position disengaged from said members.

2. The invention of claim 1, said sprags being pivotable to a third position in wedging engagement with said members.

3. The invention of claim 2, said second position being between said first and third positions.

4. The invention of claim 2, said first and second members respectively defining first and second annular races about said axis, and each of said sprags defining a first curved surface at one end thereof and second and third curved surfaces at the other end thereof, said first and second surfaces wedgingly engaging said races in said first position, and said first and third surfaces wedgingly engaging said races in said third position.

5. The invention of claim 4, said first, second and third surfaces respectively being defined about first, second and third centers of curvature by first, second and third radii, said second and third centers of curvature straddling said first center of curvature.

6. The invention of claim 5, the total length of said first radius and either of said second and third radii being greater than the radial distance between said races.

7. The invention of claim 5, said second and third radii being of equal length, whereby said sprag is symmetrical.

8. The invention of claim 4, said first and second surfaces respectively wedgingly engaging said first and second races in said first position, and said first and third surfaces respectively wedgingly engaging said first and second races in said third position.

9. The invention of claim 4, said first and second surfaces respectively wedgingly engaging said second and first races in said first position, and said first and third surfaces respectively wedgingly engaging said second and first races in said third position.

10. The invention of claim 4, said first means frictionally biasing said first cage to said first race.

11. The invention of claim 4, said clutch being rotatably supported in a housing, said second means frictionally biasing said second cage to said housing.

* * * * *